J. H. WALD.
KETTLE DRAINER.
APPLICATION FILED AUG. 25, 1919.
1,346,355.
Patented July 13, 1920.
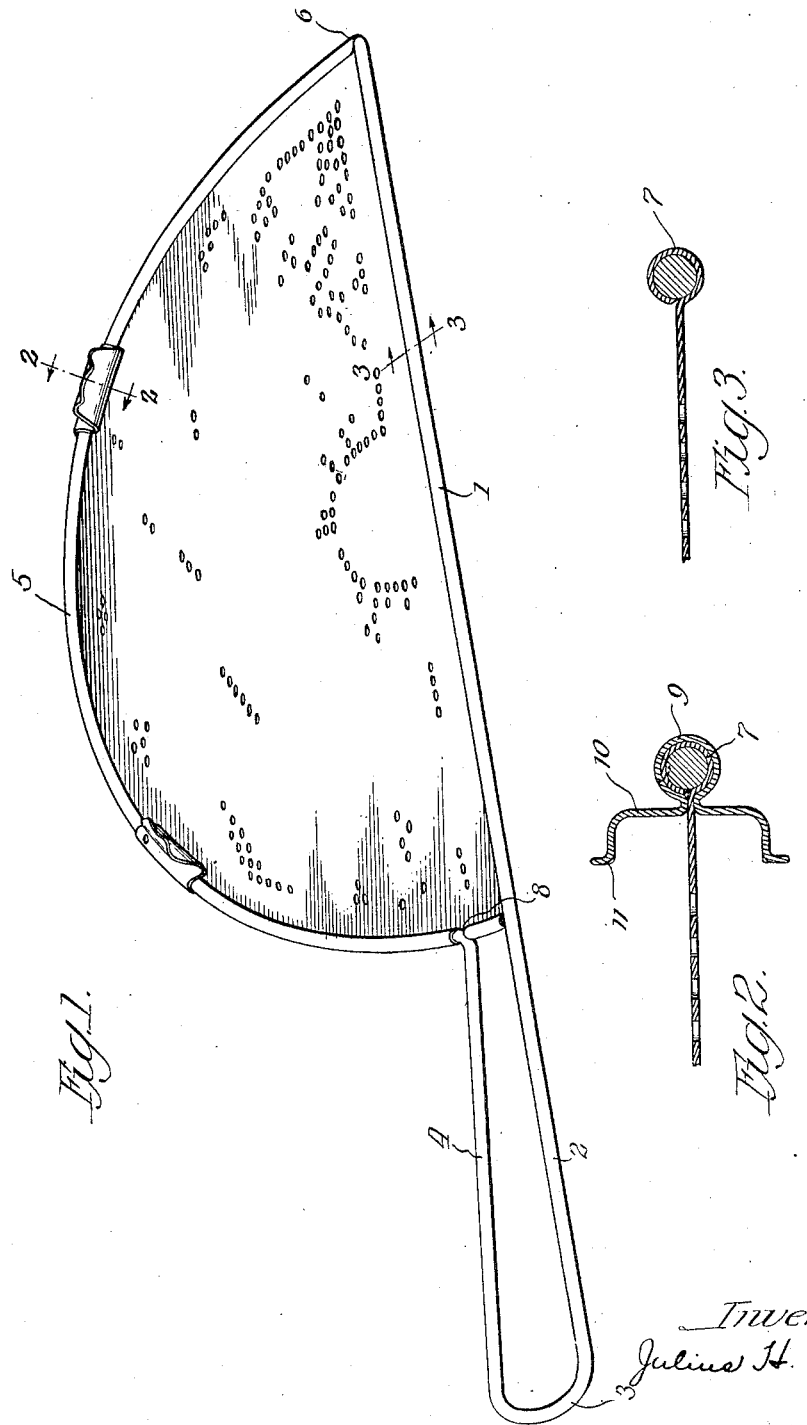
Inventor
Julius H. Wald
By
Jones, Addington, Ames & Seibold Attys

UNITED STATES PATENT OFFICE.

JULIUS H. WALD, OF CHICAGO, ILLINOIS.

KETTLE-DRAINER.

1,346,355.  Specification of Letters Patent.  Patented July 13, 1920.

Application filed August 25, 1919. Serial No. 319,606.

*To all whom it may concern:*

Be it known that I, JULIUS H. WALD, a citizen of the United States, residing at Chicago, in the county of Cook and State of Illinois, have invented new and useful Improvements in Kettle-Drainers, of which the following is a full, clear, concise, and exact description, reference being had to the accompanying drawing, forming a part of this specification.

My invention relates to improvements in strainers, and particularly to strainers for straining the liquid from pots and kettles.

Among other objects of my invention is to provide a strainer which may readily be fitted over the top of a kettle or pot to drain the pot in either direction, and which may be held in position without danger of burning the hand from the ascending steam when the device is used in straining extremely hot liquids.

For the purpose of disclosing my invention, I have illustrated one embodiment thereof in the accompanying drawing, in which—

Figure 1 is a perspective view of a strainer embodying my invention;

Fig. 2 is a sectional view taken on the line 2—2 of Fig. 1; and

Fig. 3 is a section taken on the line 3—3 of Fig. 1.

As illustrated in the drawing, the framework on which the strainer portion is supported comprises a single piece of wire, bent, with one straight edge forming the supporting portion 1 and a handle portion 2. At the handle portion the wire is bent back upon itself at 3, and the loop formed by the bent-back portion 4 forms the handle. The wire is then bent in the form of a bow, as at 5, until its opposite end meets the straight edge at about 6, whereby a semicircular frame is formed, having a handle extension. Secured on this frame is a sheet-metal foraminous strainer. This strainer is given a semi-circular shape and, as shown in the cross-sectional views, is beaded up, as at 7, and turned over the wire frame not only along the straight edge but also along the bowed edge, a notch 8 being formed in the bead formed on the rounded portion of the sheet metal to allow for the passage therethrough of the portion 4 of the handle. This sheet-metal strainer is perforated to provide suitable straining openings therethrough, and at different points, preferably past the center of the arc, are secured a pair of lugs. These lugs, as shown, are formed of a single piece of sheet metal clamped over the bead, as at 9, and extending outwardly, as at 10, and then being turned inwardly to form a lip or lug 11, so that the lugs will fit over the edge of a kettle to properly position the strainer. It will be noted that these lugs are oppositely disposed, so that the strainer can be turned over and used on either side of the kettle or in any position desired so that the handle can be taken in either hand. This is necessary in order to make the strainer universally usable, as some women will naturally take the strainer in one hand, and some will naturally take it in the other. Thus, if a purchaser should buy a strainer which had the lugs on one side only, and they were on the wrong side for the way in which she would naturally use the strainer, she would discard the strainer as worthless. However by providing lugs on both sides, no matter in which hand the handle of the strainer is grasped, it will fit properly on the kettle. Moreover, the lugs are spaced apart so that they will straddle the usual lip on a kettle, so as not to interfere. Furthermore as the lugs are spaced apart, those on the upper side will not interfere with the flow of the liquid which is being drained off, and this liquid will flow out in between the two lugs, so that there will be no splashing as would be the case if the lugs were in the path of the flowing liquid.

By providing a perforated sheet-metal strainer, as illustrated, I am enabled to keep the strainer much cleaner, and the strainer is more susceptible to cleansing than the ordinary wire mesh which is so frequently used in strainers. The wire mesh affords opportunities for grease, and the like, to catch in the joints of the mesh, and is hard to keep clean. With my sheet-metal perforated strainer I am enabled thoroughly to clean and scrub the device, so that it will at all times be maintained in a sanitary condition.

Having thus described my invention, what I claim as new and desire to secure by Letters Patent, is:

1. A kettle drainer comprising a strainer portion to fit over the top of a kettle, and having an edge curved to conform to the edge of the kettle and a handle portion extending laterally from one side of the strainer portion, and means for positioning said strainer portion with respect to the kettle, regardless of which side of the strainer portion is applied to the kettle.

2. A kettle drainer comprising a strainer portion to fit over the top of a kettle, and having an edge curved to conform to the edge of the kettle and a handle portion extending laterally from one side of the strainer portion, and means for positioning said strainer portion with respect to the kettle, regardless of which side of the strainer portion is applied to the kettle, comprising projections for engaging the upper part of the kettle, said projections extending on opposite sides of the plane of said strainer portion.

3. A kettle drainer comprising a strainer portion to fit over the top of a kettle, and having an edge curved to conform to the edge of the kettle and a handle portion extending laterally from one side of the strainer portion, and means for positioning said strainer portion with respect to the kettle, regardless of which side of the strainer portion is applied to the kettle, said means comprising two pairs of lugs secured to the edge of the strainer portion for engaging the upper part of the kettle, the lugs of each pair being spaced apart to straddle the lip of the kettle, said pairs of lugs extending on opposite sides of the plane of the strainer portion, one pair of lugs straddling the lip of the kettle, and the other pair permitting the liquid to flow therebetween.

4. A kettle drainer comprising a combination wire frame and handle comprising a semi-circular portion, to conform to the circular top of the kettle, a U-shaped portion extending from said semi-circular portion to form a handle, and a straight portion extending from said U-shaped portion to the opposite end of said curved portion, to form a support for the other edge of the strainer portion, and a sheet metal strainer portion having a curved edge beaded around the curved portion of the wire frame and a straight edge beaded around the straight portion of the wire frame.

5. A kettle drainer comprising a wire frame having a semi-circular portion shaped to conform to the upper part of the kettle, and a sheet metal strainer having a semi-circular edge beaded over said wire portion to secure it thereto and an integral sheet metal positioning lug bent to form a circular portion embracing said beaded sheet metal edge of the strainer portion and said semi-circular portion of the wire frame and two positioning lugs extending in opposite directions from the plane of said strainer portion, whereby the strainer portion will be positioned no matter which side is placed next to the kettle.

6. A kettle drainer comprising a strainer portion to fit over the top of a kettle, and having an edge curved to conform to the edge of the kettle, and a handle portion extending laterally from one side of the strainer portion, and means for positioning said strainer portion with respect to the kettle, said means comprising a pair of lugs secured to the edge of the strainer portion for engaging the upper part of the kettle, the lugs of said pair being spaced apart to straddle the lip of the kettle, whereby the liquid can flow through the lip of the kettle without interference from said lugs.

In witness whereof, I have hereunto subscribed my name.

JULIUS H. WALD.